US008904639B2

(12) United States Patent
Matsumoto et al.

(10) Patent No.: US 8,904,639 B2
(45) Date of Patent: Dec. 9, 2014

(54) METHOD OF PRODUCING LIQUID EJECTION HEAD

(75) Inventors: Keiji Matsumoto, Yokohama (JP); Shuji Koyama, Kawasaki (JP); Sakai Yokoyama, Kawasaki (JP); Kenji Fujii, Yokohama (JP); Jun Yamamuro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 13/223,066

(22) Filed: Aug. 31, 2011

(65) Prior Publication Data

US 2012/0055022 A1 Mar. 8, 2012

(30) Foreign Application Priority Data

Sep. 8, 2010 (JP) ................................ 2010-201064

(51) Int. Cl.

| | |
|---|---|
| ***B21D 53/76*** | (2006.01) |
| ***B23P 17/00*** | (2006.01) |
| ***B41J 2/135*** | (2006.01) |
| ***B41J 2/16*** | (2006.01) |

(52) U.S. Cl.

CPC .............. *B41J 2/1603* (2013.01); *B41J 2/1628* (2013.01); *B41J 2/1632* (2013.01); *B41J 2/1629* (2013.01); *B41J 2/1606* (2013.01); *B41J 2/1634* (2013.01)

USPC ........................................... 29/890.1; 347/44

(58) Field of Classification Search

CPC ...... B41J 2/1603; B41J 2/1626; B41J 2/1631; B41J 2/1623

USPC ........................................... 29/890.1; 347/44

See application file for complete search history.

(56) References Cited

U.S. PATENT DOCUMENTS

| | | | | |
|---|---|---|---|---|
| 4,362,809 | A * | 12/1982 | Chen et al. | 430/312 |
| 4,370,405 | A * | 1/1983 | O'Toole et al. | 430/312 |
| 4,557,797 | A * | 12/1985 | Fuller et al. | 438/514 |
| 4,609,614 | A * | 9/1986 | Pampalone et al. | 430/323 |
| 5,126,289 | A * | 6/1992 | Ziger | 438/671 |
| 5,607,824 | A * | 3/1997 | Fahey et al. | 430/510 |
| 5,635,333 | A * | 6/1997 | Petersen et al. | 430/311 |
| 5,948,290 | A * | 9/1999 | Yamamoto et al. | 219/121.71 |
| 6,114,085 | A * | 9/2000 | Padmanaban et al. | 430/270.1 |
| 6,669,995 | B1 * | 12/2003 | Insalaco et al. | 427/558 |

(Continued)

FOREIGN PATENT DOCUMENTS

| | | | |
|---|---|---|---|
| CN | 1080892 | A | 1/1994 |
| CN | 1621236 | A | 6/2005 |

(Continued)

*Primary Examiner* — David Angwin

(74) *Attorney, Agent, or Firm* — Canon USA Inc IP Division

(57) ABSTRACT

Disclosed is a method of including the steps of preparing a substrate having a flow-path-wall member; bonding the flow-path-wall member to a resin layer that is composed of a photo-curing resin and serves as the ejection port member such that spaces serving as the flow paths are provided between the substrate and the photo-curing resin; providing through-holes in the resin layer such that the spaces communicate with the outside air; exposing part of the resin layer to light to form an exposed portion and an unexposed portion; heating the exposed portion of the resin layer; and removing the unexposed portion from the heated resin layer to form the ejection ports, removing the unexposed portion from the heated resin layer to form the ejection ports, thereby forming the ejection port member.

8 Claims, 5 Drawing Sheets

(56) References Cited

U.S. PATENT DOCUMENTS

| | | | | |
|---|---|---|---|---|
| 7,470,505 | B2 * | 12/2008 | Bertelsen et al. | 430/320 |
| 2002/0079558 | A1 * | 6/2002 | Natarajan et al. | 257/635 |
| 2004/0253535 | A1 * | 12/2004 | Cameron et al. | 430/270.1 |
| 2007/0070122 | A1 * | 3/2007 | Bertelsen et al. | 347/44 |

FOREIGN PATENT DOCUMENTS

| | | | |
|---|---|---|---|
| CN | 1721190 | A | 1/2006 |
| CN | 101497268 | A | 8/2009 |
| EP | 1403065 | A1 | 3/2004 |
| JP | H02-024220 | B2 | 5/1990 |
| JP | 2008-119955 | A | 5/2008 |

* cited by examiner

METHOD OF PRODUCING LIQUID EJECTION HEAD

BACKGROUND OF THE INVENTION

1. Field of the Invention

The present invention relates to a method of producing a liquid ejection head for ejecting liquid.

2. Description of the Related Art

An ink jet recording head employed in an ink jet recording method, in which recording is performed by ejecting ink onto a recording medium, is a typical liquid ejection head. An ink jet recording head usually includes an ink flow path, ejection-energy generating elements provided at a part of the flow path, and fine ink-ejection ports through which ink is ejected by the energy generated by the ejection-energy generating portions.

Japanese Patent Publication No. 2-24220 discloses a method of producing a liquid ejection head, which can be applied to the production of an ink jet recording head. In the method disclosed therein, a side wall of a liquid flow path is formed on a substrate having a plurality of ejection-energy generating portions so as to enable communication with the outside at a position near the circumference of the substrate and so as to enable liquid to be supplied therefrom into the flow path. Then, a photoresist layer forming a ceiling of the flow path is laminated thereon, and the photoresist on a space serving as the flow path is exposed, heated, and cured. Finally, unexposed portions of the photoresist are removed to provide ejection ports in the photoresist.

United States Patent Application Publication No. US2007/0070122 discloses a method in which a liquid supply port is processed on the surface of a substrate having a liquid supply port penetrating from the surface to the back surface of the substrate to form a side wall of the flow path. Then, a photoresist layer is laminated thereon, and ejection ports are provided in the photoresist layer, at positions above the space that eventually serves as the flow path.

In the method disclosed in Japanese Patent Publication No. 2-24220, when the ejection ports are provided in the photoresist layer, gas in the space that eventually serves as the flow path is heated by the heat after the exposure and expands. However, because the flow path communicates with the outside air at the circumference of the substrate, the gas can be discharged. Also in the method disclosed in United States Patent Application Publication No. US2007/0070122, the expanded gas can be discharged through the supply port to the back surface of the silicon substrate. By efficiently discharging gas, the photoresist layer can be prevented from being deformed by the expanded gas.

However, because the supply port is provided at a side end of the substrate in the structure of the liquid ejection head disclosed in Japanese Patent Publication No. 2-24220, with a long liquid ejection head, liquid refilling characteristics may vary depending on the distance between the supply port and the ejection ports.

On the other hand, with the method disclosed in United States Patent Application Publication No. US2007/0070122, because the substrate having the opening is weak, the substrate may be deformed by the stress applied thereto when the photoresist layer is formed thereon. In addition, forming a flat layer on the substrate surface having an opening is difficult. Thus, a special flattening process may be required.

As has been described, with the conventional techniques, the gas expanded by the photolithography can be discharged from the supply port. However, the ejection performance of the head and the production process are limited.

SUMMARY OF THE INVENTION

The present invention can provide a method of producing, with a high yield, a liquid ejection head having an ejection port member that is precisely formed by efficiently discharging gas expanded by photolithography, with few limitations on the head structure and production process.

The present invention is a method of producing a liquid ejection head including an ejection port member having ejection ports through which liquid is ejected, and a flow-path-wall member having inner walls of liquid flow paths through which liquid is supplied to the ejection ports, the method comprising, in sequence, the steps of: preparing a substrate having the flow-path-wall member; bonding the flow-path-wall member to a resin layer that is composed of a photo-curing resin and serves as the ejection port member such that spaces serving as the flow paths are provided inside; providing through-holes in the resin layer such that the space communicates with the outside air; exposing part of the resin layer; heating the exposed portion of the resin layer; and removing the unexposed portion from the heated resin layer to form the ejection ports, thereby forming the ejection port member.

Further features of the present invention will become apparent from the following description of exemplary embodiments with reference to the attached drawings.

BRIEF DESCRIPTION OF THE DRAWINGS

FIGS. 2A to 2E1 are schematic cross-sectional views of the recording head in the production process of the method of producing a recording head according to the embodiment of the present invention.

DESCRIPTION OF THE EMBODIMENTS

Figure 1A:
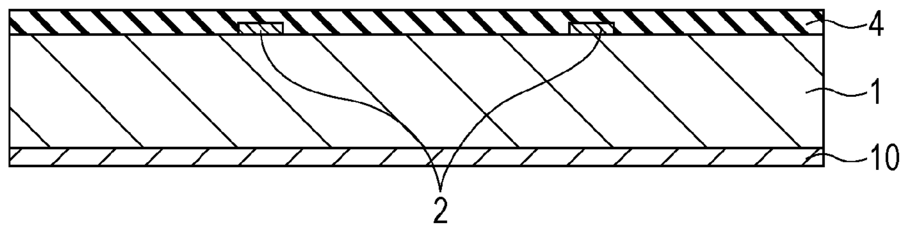
FIGS. 1A to 1C are schematic cross-sectional views of a recording head in the production process of a method of producing a recording head according to an embodiment of the present invention.

The present invention will be described below with reference to the drawings.

A liquid ejection head can be installed in an apparatus, such as a printer, a copier, a facsimile with a communication system, or a word processor with a printer, as an ink jet recording head that ejects recording ink. A liquid ejection head can also be installed in an industrial recording system combined with various processing apparatuses. In addition, a liquid ejection head can be used for producing biochips, for printing electronic circuits, and for spraying medicine.

First Embodiment

A method of producing an ink jet recording head (recording head), in which ink is used as a liquid to be ejected to form a recording image on a recording medium, the method being an example of the method of producing a liquid ejection head of the present invention, will be described below. In the following description, the same reference numerals refer to the same structures (i.e., the structures having the same functions) throughout various figures, and descriptions thereof will be omitted.

Figure 4:
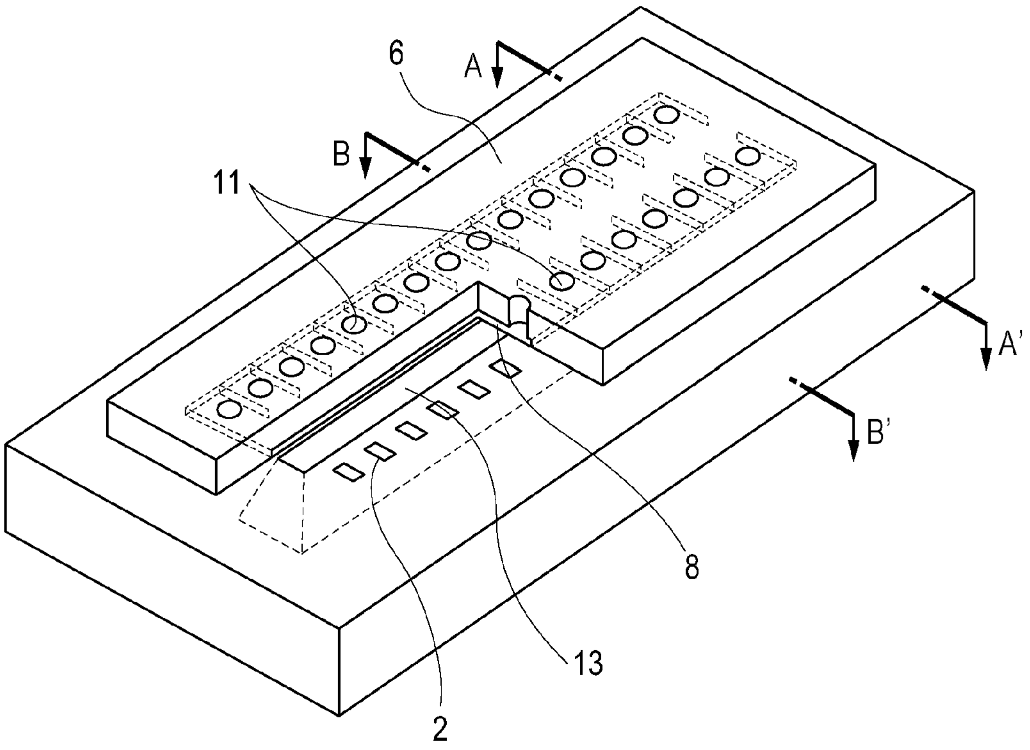
FIG. 4 is a schematic perspective view of the ink jet recording head according to the embodiment of the present invention.

FIG. 4 is a partially transparent schematic perspective view of an exemplary recording head according to a first embodiment, showing the recording head in a partially cutaway manner. The recording head includes a silicon substrate 1, on which energy generating elements 2 that generate energy for ejecting ink are arranged in rows at predetermined pitches, as shown in FIG. 4. A polyether amide layer (not shown), serving as a contact layer, is formed on the substrate 1. Furthermore, an ejection port member 6 having ejection ports 11 located above the energy generating elements 2 is formed on the substrate 1, integrally with a flow-path-wall member having a wall of ink flow paths 8. Furthermore, the substrate 1 has an ink supply port 13 penetrating through the substrate 1, between the rows of the energy generating elements 2. The ink supply port 13 communicates with the respective ejection ports 11 through the flow paths 8. When the energy generating elements 2 apply pressure to ink supplied from the ink supply port 13 to the ink flow paths 8, ink droplets are ejected from the ejection ports 11. Thus, recording is performed with the ink droplets deposited on a recording medium. Ejection ports 7 that do not contribute to the recording of an image are provided at ends of the ejection port rows provided in the ejection port member 6. These ejection ports 7 are used for recovery of the recording head.

Figure 1B:
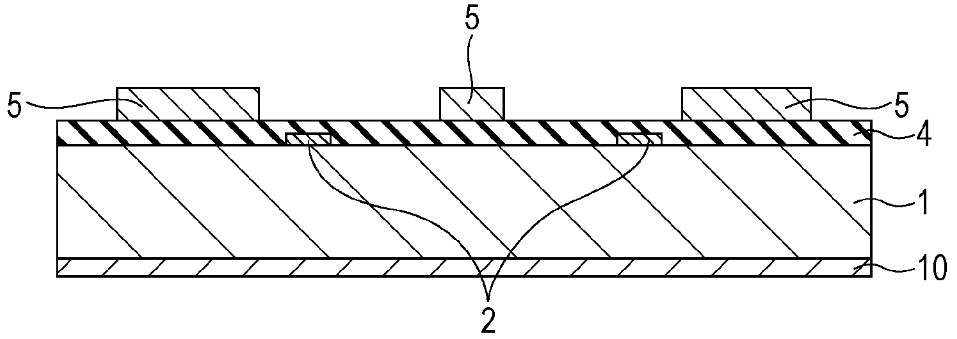
Figure 1C:
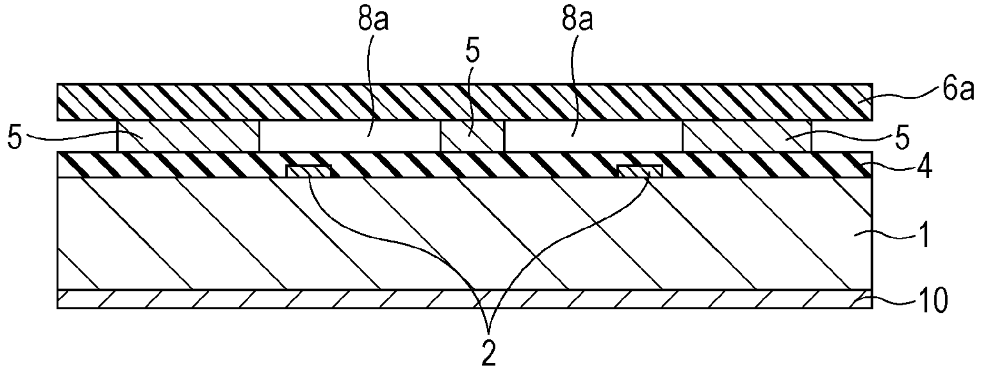
Figure 2A:
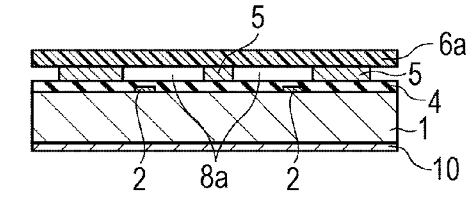
Figure 2A:
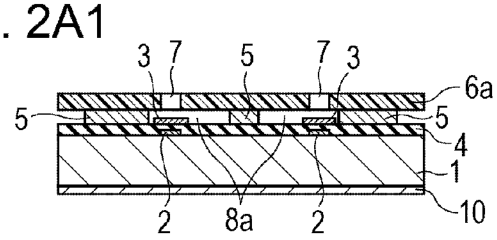

Referring to FIGS. 1A to 1C, the method of producing a recording head according to the first embodiment will be described. FIGS. 1A to 1C and FIGS. 2A to 2E are schematic cross-sectional views taken along line B-B' in FIG. 4, showing the vertical cross section of the substrate 1 at each step. FIGS. 2A1 to 2E1 are schematic cross-sectional views taken along line B-B' in FIG. 4, corresponding to FIGS. 2A to 2E, respectively, showing the vertical cross section of the substrate 1 at each step.

As shown in FIG. 1A, an insulating protection film 4 composed of, for example, a silicon compound is formed on the surface of the substrate 1, on which the energy generating elements 2 are disposed. A mask 10 used when the ink supply port 13 is formed is formed on the back surface of the substrate 1. Electric pads for electrical connection are formed by plating or film deposition. The electric pads, wiring lines, driving elements are not shown.

As shown in FIG. 1B, a layer serving as a flow-path-wall member, which is composed of a photo-curing resin, is deposited on the substrate 1 shown in FIG. 1A by spin-coating or the like. The layer is patterned by photolithography to form a flow-path-wall member 5 having the inner walls of the flow paths 8. A polyether resin layer for improving the contact may be formed under the flow-path-wall member 5.

Next, as shown in FIG. 1C, a film-like negative-type photosensitive resin layer **6*a*, which is supported by a base film and forms the ejection port member 6, is disposed on the flow-path-wall member 5 described with reference to FIG. 1B. Then, the base film (not shown) is removed. From the standpoint of the curing speed and the strength after being cured, a desirable photo-curing resin is a negative-type photosensitive resin whose base resin is an epoxy resin and which contains light cationic initiator. The resin layer 6*a* and the flow-path-wall member 5 are bonded together such that spaces 8*a* serving as the flow paths are formed and sealed therein. The film-like negative type photosensitive resin may be available from, for example, TOKYO OHKA KOGYO CO., LTD., under the trade name "TMMF" or from MicroChem Corp., under the trade name "XP SU-8 3000". To improve the bonding strength, it is desirable that the material of the resin layer 6*a* and the material of the flow-path-wall member 5** have the same composition.

Next, as shown in FIG. 2A1, through-holes 7 are provided in the resin layer **6*a* using laser light or the like, such that the internal spaces 8*a* surrounded by the flow-path-wall member 5 and the resin layer 6*a* communicate with the outside air. Desirably, the through-holes 7 are provided in the resin layer 6*a* in a dispersed manner because the through-holes 7 serve as gas escape holes in the subsequent heating step. Examples of the laser light that can be used in providing the through-holes include excimer laser light that employs krypton and fluorine gases, YAG laser light, and the like. The choice of the suitable laser light depends on the material of the resin layer 6*a*. A laser stop layer 3 composed of metal, such as copper, gold, and tantalum, or their alloy, which absorbs laser light for processing resin is formed on the insulating protection film 4. The laser stop layer 3 significantly reduces the damage to the substrate 1 because the laser stop layer 3 absorbs the laser light penetrating through the resin layer 6*a*. The laser stop layer 3 is unnecessary when CO2 laser (wavelength: 10600 nm) is used because it causes less damage to the silicon substrate 1. The through-holes 7 may be provided also by mechanical processing, such as dry etching or drilling. Any other method of providing holes may be employed, as long as the holes can be provided at such a low temperature that the gas in the spaces 8*a* does not expand until the resin layer 6*a* is substantially deformed. As shown in FIG. 2**A, the ejection ports that contribute to image formation are not yet formed at this stage.

Figure 2B:
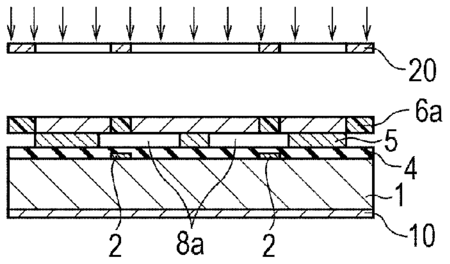
Figure 2B:
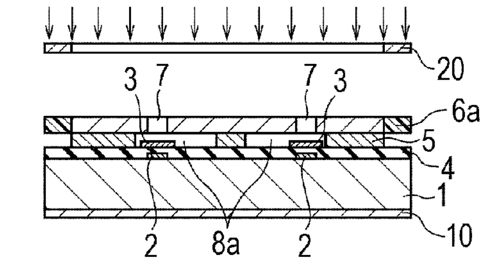

Next, as shown in FIGS. 2B and 2B1, to form the ejection port member 6, part of the resin layer **6*a* is exposed while blocking light incident on a portion that becomes the ejection ports 11 using a mask 20. At this time, to remove a portion of the resin layer 6*a* extending outward of the flow-path-wall member 5, light incident on this portion may be blocked. Although the ejection ports 11 can be formed at positions facing the energy generating elements 2, the ejection ports 11** do not necessarily have to be formed at those positions.

Figure 2C:
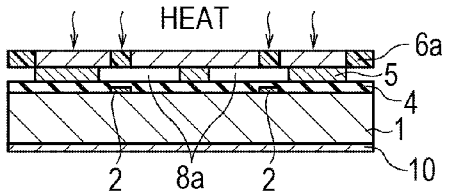
Figure 2C:
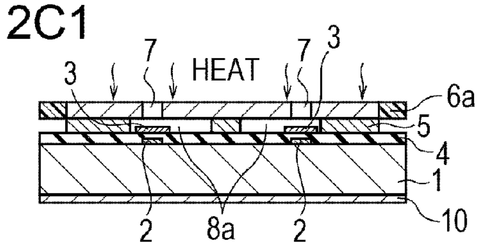

Then, as shown in FIGS. 2C and 2C1, the resin layer **6*a* is heated to cure the exposed portion. The resin layer 6*a* can be heated, in a chamber, using an oven or the like from the surface of the substrate, or using a hot-plate or the like, from the back surface of the substrate. The heating temperature can be appropriately selected according to the property of the photo-curing resin. Although the gas (air, replacement gas, or the like) in the spaces 8*a* eventually serve as the flow paths expand at this time, the resin layer 6*a* is not substantially deformed because the gas is discharged from the through-holes 7. Accordingly, the exposed portion of the resin layer 6*a* can be sufficiently cured without reducing the heating level from the originally intended level, whereby the ejection ports 11 can be formed with a high resolution and the mechanical strength of the ejection port member 6** can be increased.

Figure 2D:
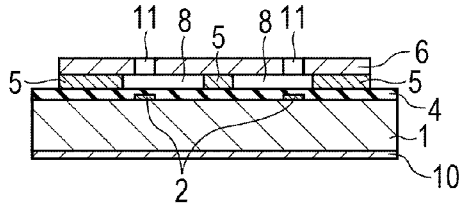
Figure 2D:
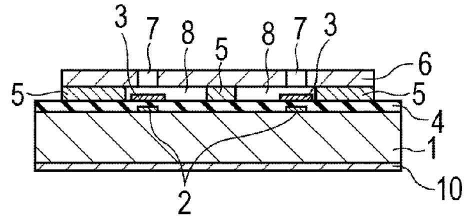
Figure 2E:
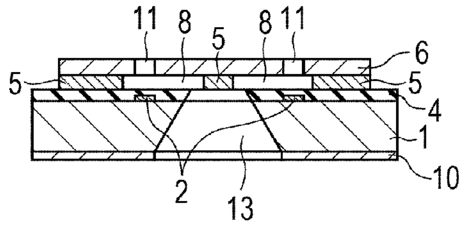
Figure 2E:
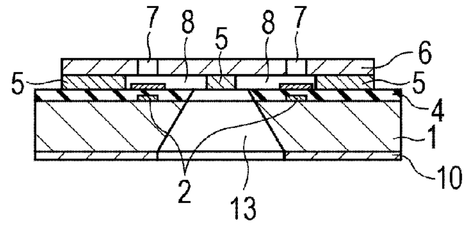

Next, as shown in FIGS. 2D and 2D1, the unexposed and, hence, uncured portion of the resin layer **6*a* is removed to form the ejection ports 11 communicating with the flow paths 8 in the resin layer 6*a*. Thus, the ejection port member 6 is formed. The ejection ports 11 are used for forming an image. On the other hand, the through-holes 7 can be used as the ejection ports that do not contribute to the formation of an image. However, the through-holes 7 may be associated with the energy generating elements 2** so that they can be used as the ejection ports for image formation.

Then, as shown in FIGS. 2E and 2E1, the mask 10 on the substrate 1, at a portion which eventually serves as the ink supply port 13, is patterned by photolithography. Then, a part of the silicon substrate 1 and the insulating protection film 4 covering the portion which eventually serves as the ink supply port 13 are removed by etching, such as wet etching or dry etching. Thus, the ink supply port 13 penetrating the substrate and communicating with the flow paths 8 is formed.

Then, the substrate 1 is divided into chips using a dicing saw or the like. An electric wiring line for driving the energy generating elements 2 are bonded to each chip, and then a chip tank member for supplying ink is bonded. Thus, a recording head that can be mounted to a recording apparatus is completed.

The present invention will be described in more detail below based on the Example.

Example

Figure 3:
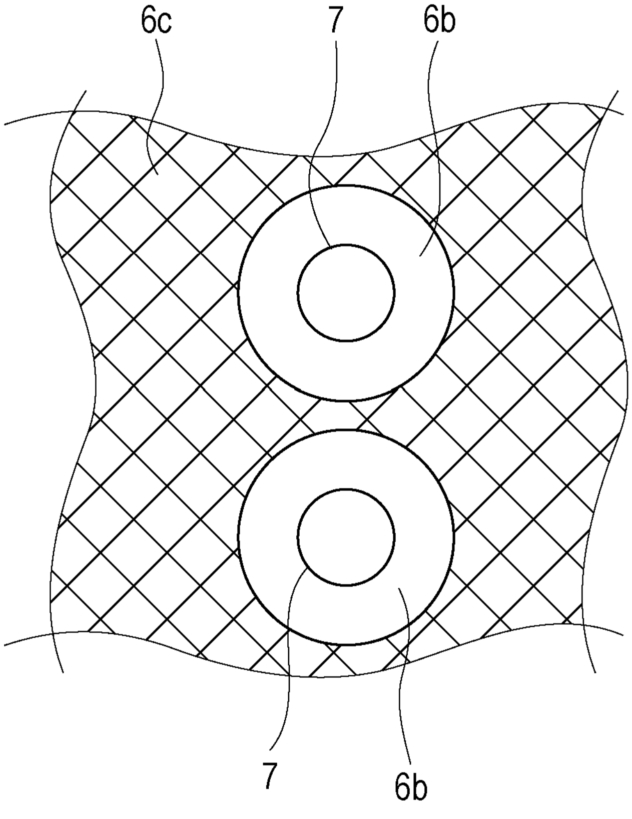
FIG. 3 is a schematic view of the recording head in the production process of the method of producing a recording head according to Example of the present invention.

FIGS. 5A to 5F are schematic cross-sectional views taken along line A-A' in FIG. 4, showing the vertical cross section of the substrate 1 at each step. FIG. 3 is a schematic view of the resin layer 6*a* viewed in the direction from above the resin layer 6*a* toward the substrate, showing a state of the resin layer 6*a* during the process.

A method of producing ink jet recording head according to Example 1 will be described.

First, the substrate 1 was prepared, on the surface of which the energy generating elements 2, composed of an exothermic material, and the insulating protection film 4, including two layers composed of SiO and SiN and deposited by plasma-CVD, were formed. SiO and SiN protect the electric wiring lines from ink. The mask 10 used for forming the ink supply port 13, formed on the back surface of the substrate 1, was an oxidation film. The electric pads for electrical connection and the laser stop layer 3 were composed of Au and formed by sputtering. The laser stop layer may also be composed of Cu or Ag. The electric pads, the wiring lines, and the driving elements are not shown. A negative-type photosensitive resin film having a thickness of 18 μm was formed on the substrate 1 by spin-coating, to form side walls of flow paths. The composition of Composition 1, composed of the aforementioned materials, is as follows.

Figure 5A:
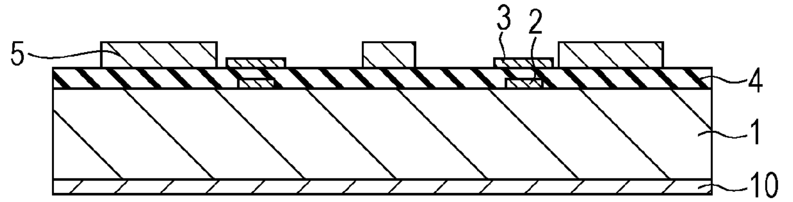
FIGS. 5A to 5F are schematic cross-sectional views of the recording head in the production process of the method of producing a recording head according to the embodiment of the present invention.

Composition 1 epoxy resin available from DAICEL CHEMICAL INDUSTRIES, LTD., under the trade name "EHPE3150": 100% by weight light cationic initiator available from ADEKA CORPORATION, under the trade name "SP-172": 6% by weight xylene (solvent) 100% by weight The negative-type photosensitive resin was exposed and developed to form the flow-path-wall member 5 (see FIGS. 1B and 5A).

Figure 5B:
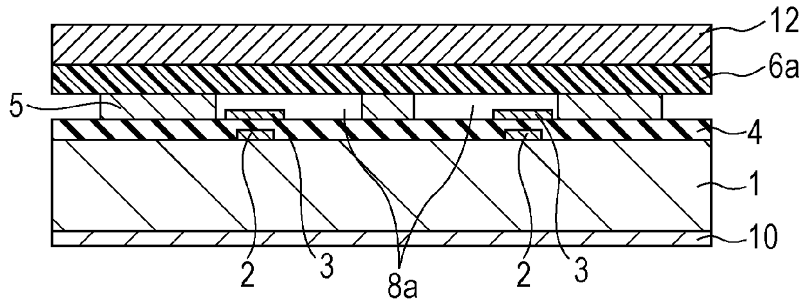
Figure 5C:
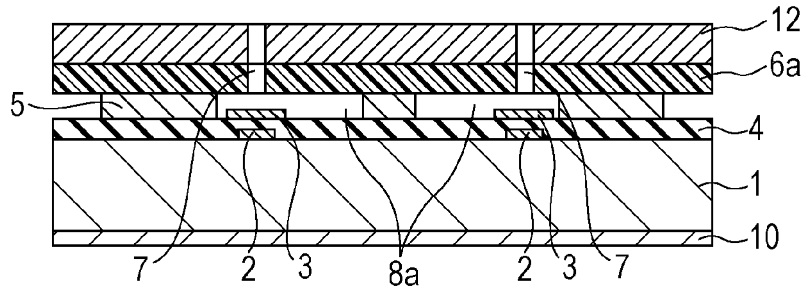
Figure 5D:
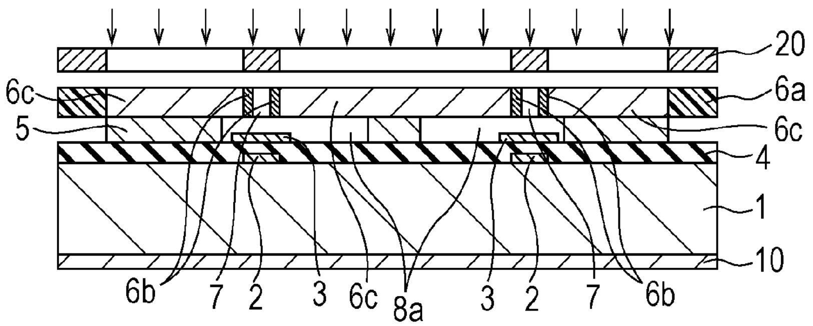

Next, the film-like resin layer 6*a* composed of the negative-type photosensitive resin was placed on the flow-path-wall member 5, together with a base film 12 (see FIG. 5B). This film-like resin layer 6*a* was obtained by drying Composition 2, below, applied to the base film composed of polyethylene terephthalate.

Composition 2 epoxy resin available from DAICEL CHEMICAL INDUSTRIES, LTD., under the trade name "EHPE3150": 100% by weight light cationic initiator available from ADEKA CORPORATION, under the trade name "SP-172": 6% by weight The film-like resin layer 6*a* was laminated by using a laminator available from MCK CO., LTD, under the trade name "MDF-200C", at a roller temperature of 35° C., a stage temperature of 35° C., a roller speed of 10 mm/s, and a roller pressure of 0.2 MPa. The resin layer 6*a* was placed on the flow-path-wall member 5, together with the base film 12.

Next, laser light was emitted to both the resin layer 6*a* and the base film 12 to from the through-holes 7 having a diameter of 10 μm in the resin layer 6*a* (see FIG. 5C), such that the enclosed spaces 8*a* surrounded by the flow-path-wall member 5 and the resin layer 6*a* communicate with the air. The fundamental wave (wavelength: 1064 nm) of YAG laser was used, and the output and frequency of the laser light were appropriately selected. Thus, the holes penetrating through the base film 12 and the resin layer 6*a* were provided by the laser light. Because the resin layer 6*a* was processed while being supported, by-products generated by processing the resin layer 6*a* with the laser light was prevented from being deposited on the top surface of the resin layer 6*a* serving as the ejection port surface.

Next, using an i-line exposure FPA-3000i5 (wavelength: 365 nm) available from CANON KABUSHIKI KAISHA, the resin layer 6*a* was exposed with a portion to be provided with the ejection ports being covered with the mask 20 (see FIG. 2B) to form the ejection port member. At this time, at the position of A-A' cross section, light was blocked with the mask 20 so that the portions surrounding the through-holes 7 in the resin layer 6*a* were not exposed. Thus, an exposed portion 6*c* was formed in the resin layer 6*a*, and unexposed portions 6*b* were left around the through-holes 7 because the light incident thereon was blocked (see FIGS. 5D and 3).

Figure 5E:
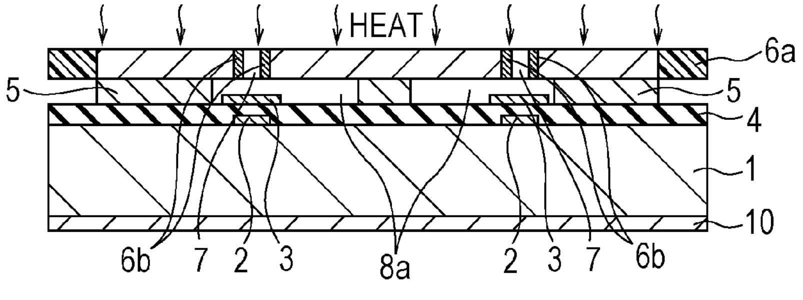
Figure 5F:
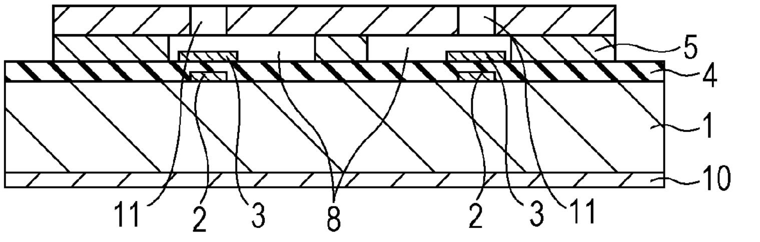

Then, the resin layer 6*a* was heated at 90° C. for four minutes to cure the exposed portion (see FIGS. 2C and 5E). The gas in the spaces 8*a* expanded by the heat was discharged from the through-holes 7. The unexposed portions 6*b* around the through-holes 7 were not cured.

Next, development was performed to provide the ejection ports 11. At the position of A-A' cross section, the unexposed portions 6*b* around the through-holes 7 were removed by the development, and the ejection ports 11 used for forming an image, having a diameter of 15 μm, which is larger than the diameter of the through-holes, were formed (see FIGS. 2D and 5F). Thus, the inner walls of the ejection ports 11, which were rough surfaces because of the laser processing, were smoothed out, creating the smooth inner walls of the ejection ports 11. In this manner, the through-holes 7 can be transformed into the ejection ports 11 used for forming an image. This enables the through-holes 7 to be utilized as the ejection ports, eliminating the need of a special area for the through-holes 7. Thus, the structural limitations of the recording head can be reduced.

Next, the mask 10 on the portion which eventually serves as the ink supply port 13 was patterned to form an opening pattern of the ink supply port 13. Thereafter, using tetramethyl ammonium hydroxide solution from the opening, the supply port 13 was formed (see FIGS. 2E and 2E1).

Then, the substrate was divided into chips using a dicing saw or the like. An electric wiring line for driving the energy generating elements 2 were bonded to each chip, and then a chip tank member for supplying ink was bonded. Thus, a recording head was obtained. As a result of the observation of the recording head from the side surface, no warping was found in the ejection port surface. Furthermore, good printing results were obtained with this recording head, without blurring.

The present invention enables high-yield production of a liquid ejection head having an ejection port member that is precisely formed and prevented from being deformed by efficiently discharging internal gas from through-holes provided in an ejection port member in an ejection-port forming step, with flexibility in structure and production process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-201064 filed Sep. 8, 2010, which is hereby incorporated by reference herein in its entirety.

What is claimed is:

1. A method of producing a liquid ejection head including an ejection port member having ejection ports through which liquid is ejected, and a flow-path-wall member having inner walls of liquid flow paths through which liquid is supplied to the ejection ports, the method comprising, in sequence, the steps of:

preparing a substrate having the flow-path-wall member on or above the substrate;

bonding the flow-path-wall member to a resin layer that is composed of a photo-curing resin and serves as the ejection port member such that spaces serving as the flow paths are provided between the substrate and the photo-curing resin;

providing through-holes in the resin layer such that the spaces communicate with the outside air;

exposing part of the resin layer to light to form an exposed portion and an unexposed portion;

heating the exposed portion of the resin layer; and removing the unexposed portion from the heated resin layer to form the ejection ports, thereby forming the ejection port member.

2. The method according to claim 1, wherein a liquid supply port communicating with the flow paths is provided in the substrate so as to penetrate through the substrate and so as to communicate with the spaces, after the through-holes are formed.

3. The method according to claim 1, wherein the resin layer is irradiated with laser light to provide the through-holes.

4. The method according to claim 1, wherein liquid energy generating elements configured to generate energy for ejection are provided on the surface of the substrate, and wherein the ejection ports and the through-holes are provided in the resin layer, at portions facing the energy generating elements.

5. The method according to claim 3, wherein the resin layer is supported by a base film, is bonded to the flow-path-wall member, is irradiated with the laser light together with the base film so that the through-holes are provided in the resin layer, and then the base film is removed.

6. The method according to claim 1, wherein the resin layer having the through-holes is exposed such that portions surrounding the through-holes are left unexposed.

7. The method according to claim 1, wherein the step of preparing the substrate includes the substeps of:

applying a material of the flow-path-wall member to the substrate; and forming the flow-path-wall member from the material.

8. The method according to claim 1, wherein the liquid ejection head is an ink jet recording head configured to form a recording image on a recording medium using ink as ejecting liquid, and wherein the through-holes are provided in the resin layer, at portions facing the energy generating elements that do not contribute to formation of the recording image.

* * * * *